United States Patent
Aktas et al.

(10) Patent No.: US 12,279,288 B2
(45) Date of Patent: Apr. 15, 2025

(54) CONGESTION CONTROL IN A SIDELINK COMMUNICATION NETWORK

(71) Applicant: QUALCOMM Incorporated, San Diego, CA (US)

(72) Inventors: Tugcan Aktas, La Jolla, CA (US); Seyedkianoush Hosseini, San Diego, CA (US); Wei Yang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 17/449,569

(22) Filed: Sep. 30, 2021

(65) Prior Publication Data

US 2022/0110130 A1    Apr. 7, 2022

Related U.S. Application Data

(60) Provisional application No. 63/198,180, filed on Oct. 1, 2020.

(51) Int. Cl.
| | | |
|---|---|---|
| *H04W 4/00* | (2018.01) | |
| *H04W 72/02* | (2009.01) | |
| *H04W 72/0446* | (2023.01) | |
| *H04W 72/20* | (2023.01) | |
| *H04W 72/52* | (2023.01) | |
| *H04W 72/542* | (2023.01) | |

(52) U.S. Cl.
CPC ........... *H04W 72/52* (2023.01); *H04W 72/02* (2013.01); *H04W 72/0446* (2013.01); *H04W 72/20* (2023.01); *H04W 72/542* (2023.01)

(58) Field of Classification Search
USPC ........................................ 370/329, 330, 328
See application file for complete search history.

(56) References Cited

U.S. PATENT DOCUMENTS

| | | | |
|---|---|---|---|
| 2018/0048577 A1* | 2/2018 | Gulati ..................... | H04L 47/11 |
| 2018/0234973 A1* | 8/2018 | Lee ................... | H04W 72/0453 |
| 2019/0104525 A1* | 4/2019 | Santhanam ....... | H04W 28/0252 |
| 2020/0068593 A1* | 2/2020 | Seo ........................ | H04W 76/36 |
| 2020/0351705 A1* | 11/2020 | Chae .................... | H04W 72/23 |
| 2021/0055959 A1* | 2/2021 | Rehman ................ | G06F 9/4881 |

\* cited by examiner

*Primary Examiner* — Chuong T Ho
(74) *Attorney, Agent, or Firm* — Harrity & Harrity, LLP

(57) ABSTRACT

Various aspects of the present disclosure generally relate to wireless communication. In some aspects, a user equipment (UE) may determine, based at least in part on a weighted number of UEs that is based at least in part on respective resource utilizations by the UEs, a resource utilization limit for the UE. The UE may selectively transmit a communication based at least in part on the resource utilization limit for the UE. Numerous other aspects are provided.

30 Claims, 7 Drawing Sheets

CONGESTION CONTROL IN A SIDELINK COMMUNICATION NETWORK

CROSS-REFERENCE TO RELATED APPLICATION

This patent application claims priority to U.S. Provisional Patent Application No. 63/198,180, filed on Oct. 1, 2020, entitled "CONGESTION CONTROL IN A SIDELINK COMMUNICATION NETWORK," and assigned to the assignee hereof. The disclosure of the prior application is considered part of and is incorporated by reference into this patent application

FIELD OF THE DISCLOSURE

Aspects of the present disclosure generally relate to wireless communication and to techniques and apparatuses for congestion control in a sidelink communication network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining, based at least in part on a weighted number of UEs that is based at least in part on respective resource utilizations by the UEs, a resource utilization limit for the UE, wherein the UEs are associated with a sidelink channel; and selectively transmitting a communication based at least in part on the resource utilization limit for the UE.

In some aspects, a UE for wireless communication includes a memory; and one or more processors coupled to the memory, the one or more processors configured to: determine, based at least in part on a weighted number of UEs that is based at least in part on respective resource utilizations by the UEs, a resource utilization limit for the UE, wherein the UEs are associated with a sidelink channel; and selectively transmit a communication based at least in part on the resource utilization limit for the UE.

In some aspects, a non-transitory computer-readable medium storing a set of instructions for wireless communication includes one or more instructions that, when executed by one or more processors of a UE, cause the UE to: determine, based at least in part on a weighted number of UEs that is based at least in part on respective resource utilizations by the UEs, a resource utilization limit for the UE, wherein the UEs are associated with a sidelink channel; and selectively transmit a communication based at least in part on the resource utilization limit for the UE.

In some aspects, an apparatus for wireless communication includes means for determining, based at least in part on a weighted number of UEs that is based at least in part on respective resource utilizations by the UEs, a resource utilization limit for the apparatus, wherein the UEs are associated with a sidelink channel; and means for selectively transmitting a communication based at least in part on the resource utilization limit for the apparatus.

Some aspects described herein relate to a UE for wireless communication. The user equipment may include a memory and one or more processors coupled to the memory. The one or more processors may be configured to determine, based at least in part on a weighted number of UEs that is based at least in part on respective resource utilizations by UEs associated with a sidelink channel, a resource utilization limit for the UE. The one or more processors may be configured to transmit a communication based at least in part on the resource utilization limit for the UE.

Some aspects described herein relate to a method of wireless communication performed by a UE. The method may include determining, based at least in part on a weighted number of UEs that is based at least in part on respective resource utilizations by UEs associated with a sidelink channel, a resource utilization limit for the UE. The method may include transmitting a communication based at least in part on the resource utilization limit for the UE.

Some aspects described herein relate to a non-transitory computer-readable medium that stores a set of instructions for wireless communication by a UE. The set of instructions, when executed by one or more processors of the UE, may cause the UE to determine, based at least in part on a weighted number of UEs that is based at least in part on respective resource utilizations by UEs associated with a sidelink channel, a resource utilization limit for the UE. The set of instructions, when executed by one or more processors of the UE, may cause the UE to transmit a communication based at least in part on the resource utilization limit for the UE.

Some aspects described herein relate to an apparatus for wireless communication. The apparatus may include means for determining, based at least in part on a weighted number of UEs that is based at least in part on respective resource utilizations by UEs associated with a sidelink channel, a resource utilization limit for the apparatus. The apparatus may include means for transmitting a communication based at least in part on the resource utilization limit for the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
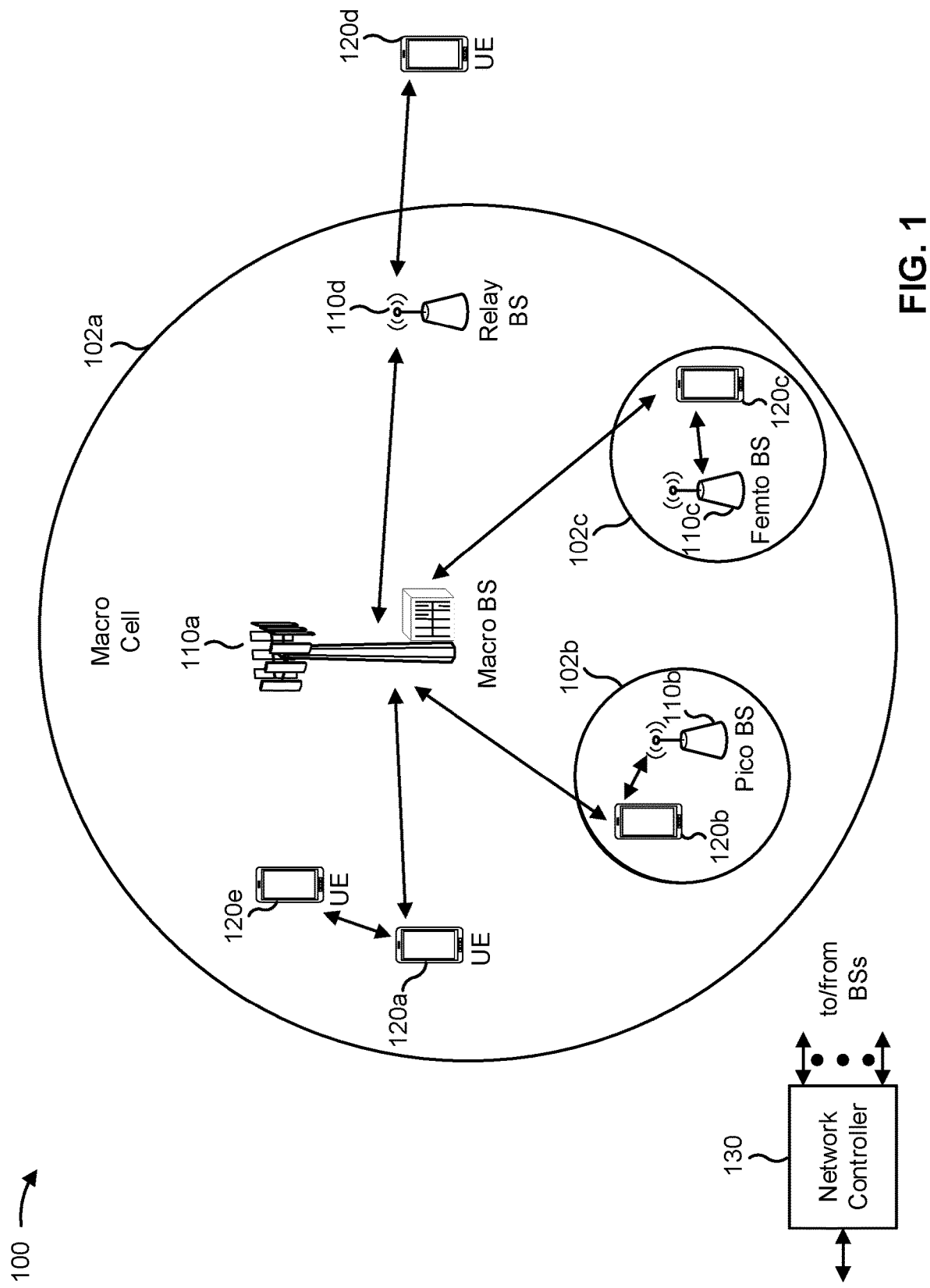
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TR", "A", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz—300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
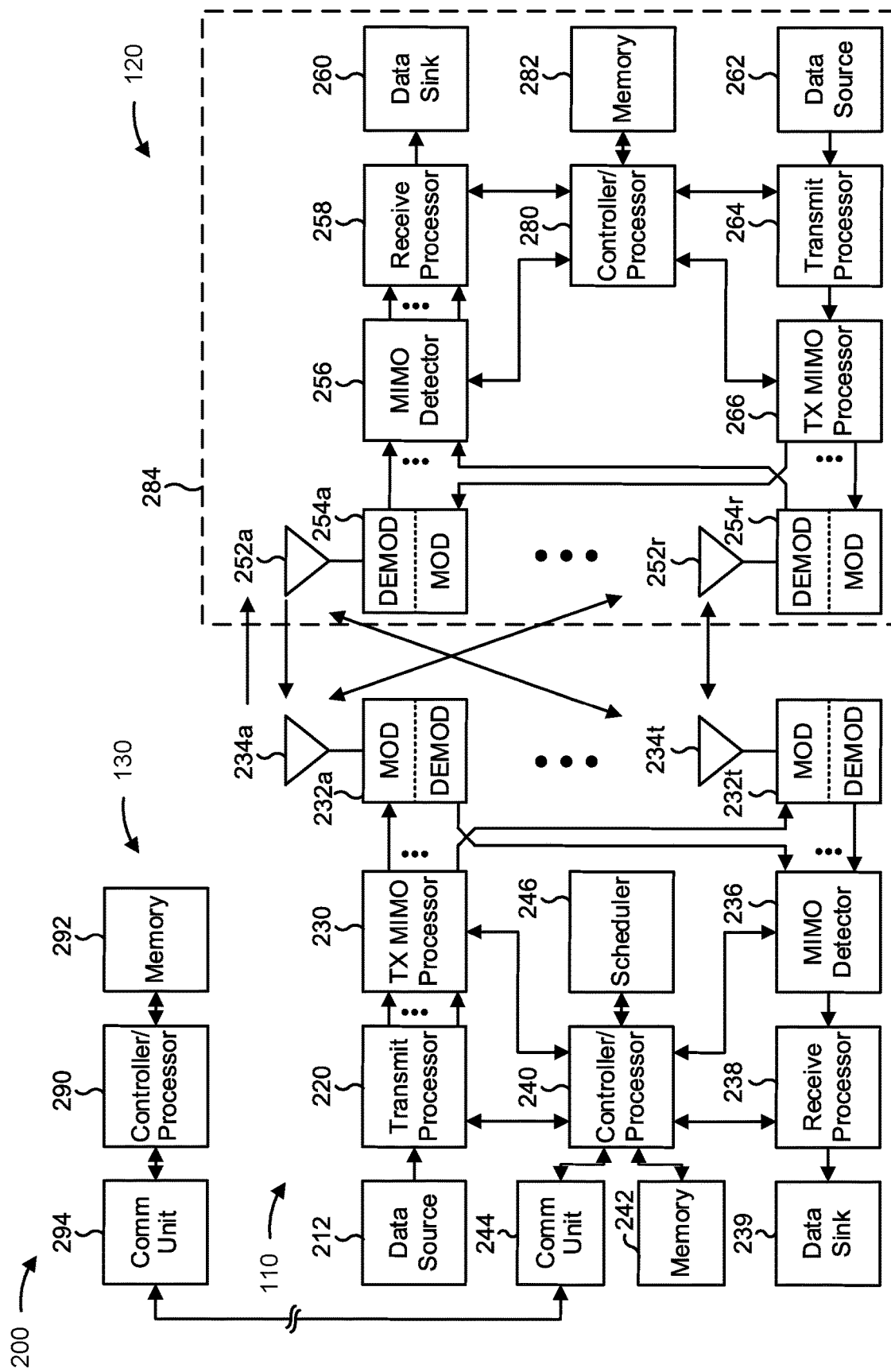
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with congestion control in a sidelink communication network, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for determining, based at least in part on a weighted number of UEs that is based at least in part on respective resource utilizations by the UEs, a resource utilization limit for the UE; and/or means for selectively transmitting a communication based at least in part on the resource utilization limit for the UE 120. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for determining the weighted number of UEs based at least in part on a preferred resource utilization of the channel by the UE. In some aspects, the UE includes means for determining the resource utilization limit for the UE based at least in part on a ratio of an overall utilization limit on utilization of the channel and the weighted number of UEs. In some aspects, the UE includes means for determining the respective resource utilizations based at least in part on identities of the UEs indicated by a second stage of the sidelink control information, and for determining the respective resource utilizations based at least in part on a first stage of the sidelink control information. In some aspects, the UE includes means for estimating the weighted number of UEs.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A sidelink communication network may include a base station and a plurality of UEs. The plurality of UEs may communicate (e.g., transmit and/or receive data) with one another via one or more sidelink channels in a sidelink mode. The base station may communicate with each of the plurality of UEs via respective access links.

In some sidelink modes (e.g., Mode-2 Resource Allocation Mode), the plurality of UEs, and not the base station, may control utilization of available communication resources (e.g., radio interface resources such as frequency resources and/or time resources) by performing resource selection for and/or scheduling of communications in the sidelink communication network. In such sidelink modes, without the base station controlling utilization of available resources, the sidelink communication network may experience overloading due to, for example, a threshold number of UEs utilizing the available resources and/or a threshold amount of utilization of the available resources by one or more UEs. The threshold amount of utilization may include, for example, utilization by one or more UEs frequently transmitting messages in, for example, a V2X network and/or utilization by one or more UEs unexpectedly transmitting a threshold amount of data to consume the available resources. To avoid such overloading, the plurality of UEs may autonomously implement a distributed congestion control (DCC) scheme.

To implement the DCC scheme, a UE may limit a number of available resources that are utilized by the UE (e.g., number of utilized resources), and thereby enable a fair allocation of the number of available resources among the plurality of UEs in the sidelink communication network.

In one example, the UE may enable a fair allocation of the number of available resources by equally dividing the number of available resources among the plurality of UEs. To do so, the UE may estimate a number of the plurality of UEs in the sidelink communication network. The UE may estimate the number of the plurality of UEs by measuring a channel busy ratio (CBR) associated with the sidelink communication network. The CBR may indicate a relationship of a number of resources being utilized by one or more UEs with respect to a total number of resources accessible in the sidelink communication network. For example, the CBR may identify a fraction of resources (e.g., subchannels) whose RSSI exceeds a threshold of X dBm, where X is a number.

A UE may fail to adequately estimate the number of the plurality of UEs based at least in part on the CBR because the UE is unable to account for a situation where a first UE may utilize a different number of the available resources with respect to a second UE. For example, some UEs may perform more frequent transmissions, larger transmissions, higher-priority transmissions, or the like, relative to other UEs. Rather, the UE may estimate the number of the plurality of UEs by assuming that each UE utilizes an equal number of resources with respect to every other UE.

For instance, in a situation where a sidelink communication network, with a total of 1000 accessible resources, includes 250 UEs, with 50 UEs utilizing 4 resources and 200 UEs utilizing 2 resources, the UE may measure a CBR of 60%, indicating that 600 out of the 1000 accessible resources are being utilized (e.g., based at least in part on the 600 resources being associated with a threshold RSSI). Because the UE may assume that each UE utilizes an equal number of resources with respect to every other UE, the UE may assume that each UE either utilizes, for example, 4 resources or that each UE utilizes, for example, 2 resources. In the former case, when the UE assumes that each UE utilizes 4 resources, the UE may estimate the number of the plurality of UEs to be 600/4=150 UEs. In the latter case, when the UE assumes that each UE utilizes 2 resources, the UE may estimate the number of the plurality of UEs to be 600/2=300 UEs. In either case, the UE may fail to adequately estimate the number of the plurality of UEs. The estimation by the UE may be rendered further inadequate in a sidelink communication network with UEs having heterogeneous resource requirements (e.g., UEs that utilize a variable number of the available resources).

Without the benefit of an adequate estimate of the number of the plurality of UEs, the UE may be unable to effectively limit the number of utilized resources. As a result, the UE may be unable to effectively implement the DCC scheme, and thereby fail to enable the fair allocation of the number of the available resources among the plurality of UEs, which leads to inefficient utilization of sidelink resources, diminishing throughput.

In another example, the UE may limit the number of utilized resources based at least in part on fixed CBR ranges. For instance, the UE may refer to, for example, a table indicating different limits for respective CBR ranges, such that the UE applies a first limit to the number of utilized resources when a first CBR range is determined, applies a second limit to the number of utilized resources when a second CBR range is determined, and so on. Such an approach to limiting the number of utilized resources based at least in part on a table including fixed CBR ranges may be ineffective because the approach fails to account for heterogeneous resource requirements of the plurality of the UEs and to provide the UE with flexibility to limit the number of utilized resources based at least in part on the heterogeneous resource requirements.

Various aspects of techniques and apparatuses described herein may enable a UE to perform congestion control in a sidelink communication network. In some aspects, the techniques and apparatuses described herein enable a UE to effectively implement a DCC scheme by adequately estimating a weighted number of UEs in a sidelink communication network. In some aspects, estimating the weighted number of UEs may account for the plurality of UEs utilizing a different number of resources with respect to each other and/or for heterogeneous resource requirements of the plurality of UEs. As a result, the techniques and apparatuses described herein may enable the UE to effectively limit a number of utilized resources by the UE. By effectively limiting the number of utilized resources, the UE may enable a fair allocation of a total number of accessible resources in the sidelink communication network among the plurality of UEs. In some aspects, the UE may determine, based at least in part on a weighted number of UEs that is based at least in part on respective resource utilizations by the UEs, a resource utilization limit for the UE, and may selectively transmit a communication based at least in part on the resource utilization limit for the UE.

Figure 3:
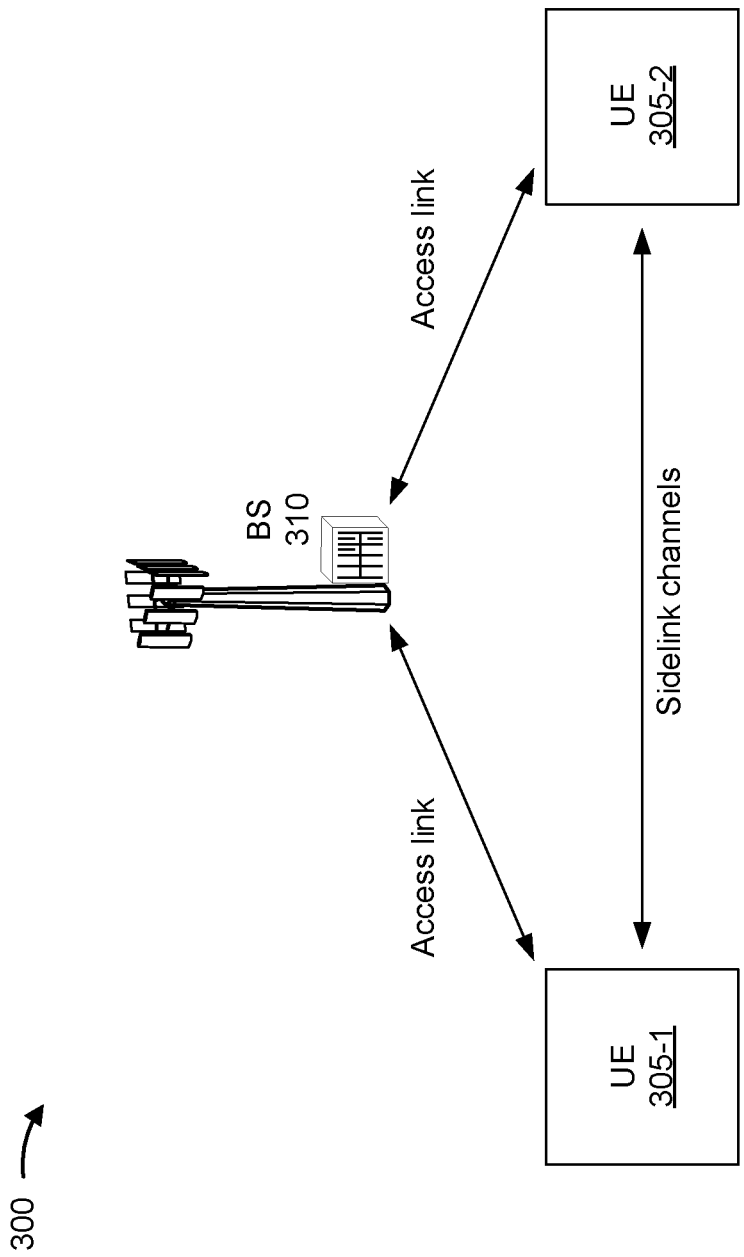
FIG. 3 is a diagram illustrating an example of a sidelink communication network, in accordance with the present disclosure.

FIG. 3 is a diagram illustrating an example 300 of a sidelink communication network, in accordance with the present disclosure. The sidelink communication network may include a base station 110 and a plurality of UEs (shown as UE 305-1 and UE 305-2). As shown in FIG. 3, the UE 305-1 and the UE 305-2 may communicate (e.g., transmit and/or receive data) with one another via one or more sidelink channels in a sidelink mode. The base station 110 may communicate with the UE 305-1 via a first access link and/or communicate with the UE 305-2 via a second access link. In some aspects, a sidelink channel between the UE 305-1 and the UE 305-2 may be implemented utilizing, for example, a PC5 interface and an access link between the base station 110 and a UE (e.g., the UE 305-1 or the UE 305-2) may be implemented utilizing, for example, a Uu interface. Sidelink communications may be transmitted and received via the sidelink channels and access link communications may be transmitted and received via the access links. The UE 305-1 and/or the UE 305-2 may include one or more UEs described elsewhere herein, such as UE 120 discussed with respect to FIG. 2. The base station 310 may include one or more base stations described elsewhere herein, such as base station 110 discussed with respect to FIG. 2.

As indicated above, FIG. 3 is provided as an example. Other examples may differ from what is described with respect to FIG. 3.

Figure 4:
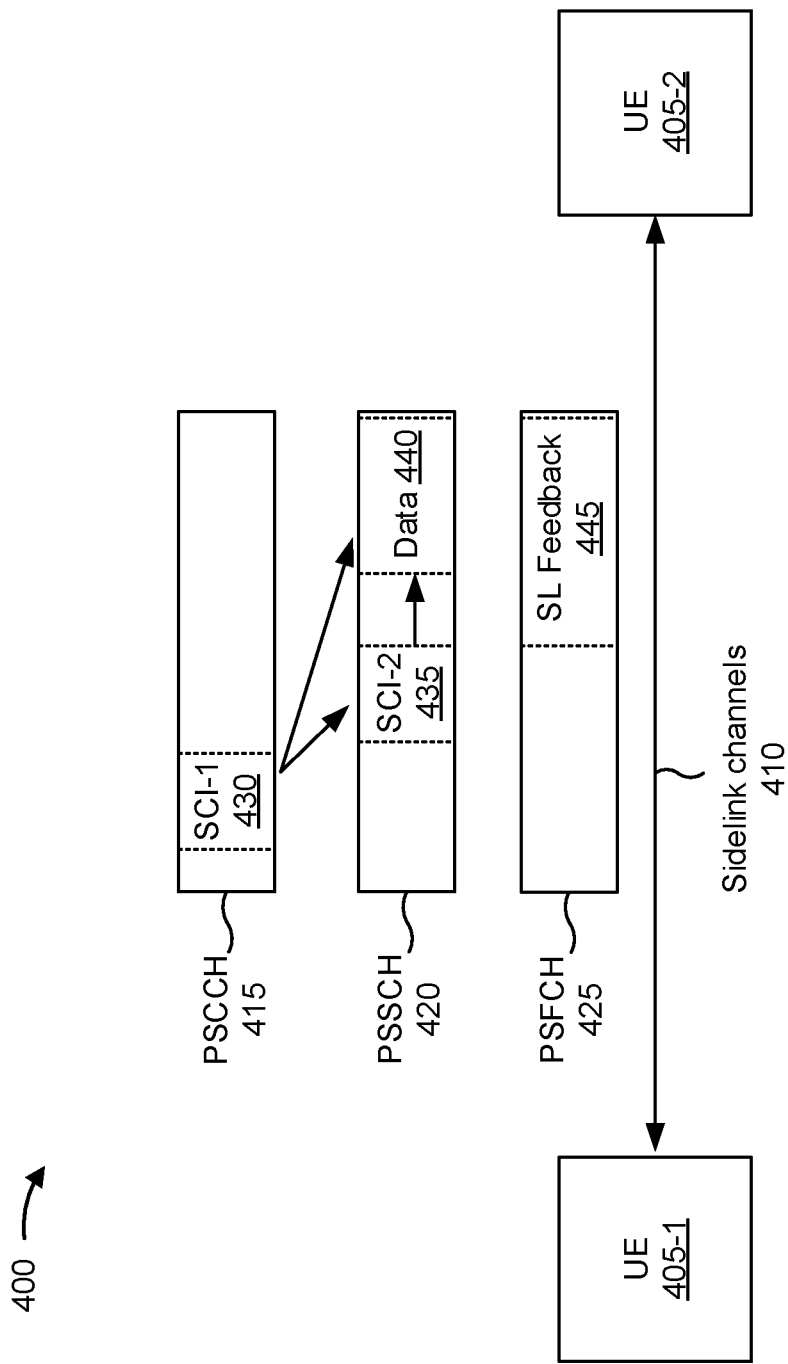
FIG. 4 is a diagram illustrating an example of communication channels in a sidelink communication network, in accordance with the present disclosure.

FIG. 4 is a diagram illustrating an example 400 of communication channels in a sidelink communication network, in accordance with the present disclosure. The sidelink communication network may include a plurality of UEs including, for example, UE 405-1 and UE 405-2 communicating with each other (and one or more other UEs associated with the sidelink communication network) using one or more sidelink channels 410. The plurality of UEs included in the sidelink communication network may include a plurality of UEs within a given geographical area (e.g., a given radius around a given UE). In some aspects, the plurality of UEs within the given geographical area may provide a UE density (e.g., $N_{Sta}$) associated with the sidelink communication network. For example, $N_{Sta}$ may identify a number of UEs within a threshold distance of a UE. In some aspects, the UE 405-1 and/or the UE 405-2 may include one or more UEs described elsewhere herein, such as UE 120 discussed with respect to FIG. 2 and/or the UEs (e.g., UE 305-1 and/or UE 305-2) discussed with respect to FIG. 3.

As shown in FIG. 4, the UE 405-1 may communicate with the UE 405-2 (and one or more other UEs) via sidelink channels 410. Communications utilizing the one or more sidelink channels 410 may include, for example, P2P communications, D2D communications, V2X communications (e.g., V2V communications, V2I communications, and/or vehicle-to-pedestrian (V2P) communications), and/or mesh networking communications.

In some aspects, the sidelink channels 410 may use a PC5 interface and/or may operate in, for example, a high frequency band (e.g., the 5.9 GHz band) and/or an unlicensed or shared frequency band (e.g., an NR unlicensed (NR-U) frequency band). Additionally, or alternatively, the UEs 405-1, 405-2 may synchronize timing of transmission time intervals (TTIs) (e.g., frames, subframes, slots, and/or symbols) using global navigation satellite system (GNSS) timing.

As further shown in FIG. 4, the sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel.

The sidelink channels 410 may carry sidelink control information (SCI) to indicate various control information used for sidelink communications. The sidelink control information may include, for example, sidelink control information part 1 (SCI-1) 430 and sidelink control information part 2 (SCI-2) 435. The SCI-1 430 may be included in the PSCCH 415 and the SCI-2 435 may be included in the PSSCH 420. The SCI-1 430 may include a scheduling assignment regarding one or more resources of the sidelink channels 410 (e.g., time resources, frequency resources, and/or spatial resources). For instance, the scheduling assignment included in the SCI-1 430 may include information indicating a number of resources utilized by one or more respective UEs (e.g., respective resource utilization ($R_i$)) included in the sidelink network. The SCI-2 435 may include various types of information, such as, for example, a hybrid automatic repeat request (HARQ) process identifier (ID), a new data indicator (NDI) associated with the data 440, a unique identifier associated with a transmitting UE (a unique TX ID), a unique identifier associated with a receiving UE (a unique receive (RX) ID), and/or a channel state information (CSI) report trigger.

The PSSCH 420 may also include data 440 and information such as, for example, information for decoding sidelink communications on the PSSCH 420, a quality of service (QoS) priority value, a resource reservation period, a PSSCH DMRS pattern, an SCI format and/or a beta offset for SCI-2 435 transmitted on the PSSCH 420, a quantity of PSSCH DMRS ports, and/or an MCS.

In some aspects, the UE 405-1 may transmit both the SCI-1 430 and the SCI-2 435. In some aspects, the UE 405-1 may transmit only SCI-1 430, in which case one or more types of the information that would otherwise be transmitted in the SCI-2 435 may be transmitted in the SCI-1 430 instead. The PSFCH 425 may be used to communicate sidelink (SL) feedback 445, such as, for example, HARQ feedback (e.g., acknowledgement or negative acknowledgement (ACK/NACK) information), transmit power control (TPC), and/or a scheduling request (SR).

In some aspects, the one or more sidelink channels 410 may use resource pools shared by the plurality of UEs. In some aspects, a scheduling assignment (e.g., included in SCI-1 430) may be transmitted in sub-channels using specific resource blocks (RBs) across time. In some aspects, data 440 (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions may be transmitted using non-adjacent RBs.

In some aspects, the UE 405-1 may operate using a communication mode (e.g., Mode-2 Resource Allocation Mode) where resource selection and/or scheduling is performed by the UE 405-1 (e.g., rather than a base station 310). In some aspects, the UE 405-1 may perform resource selection and/or scheduling by determining respective resource utilization ($R_i$) of resources of the sidelink channels 410. In some aspects, the UE 405-1 may determine the $R_i$ by decoding information in the SCI-1 430 that indicates the $R_i$. In some aspects, the UE may determine the $R_i$ within a measurement duration of time (e.g., 100 milliseconds, though other durations of time may be used) by decoding the information in one or more instances of the SCI-1 430 within the measurement duration of time. Additionally, or alternatively, the UE 405-1 may determine $R_i$ by measuring, for example, an RSSI parameter (e.g., a sidelink-RSSI (S-RSSI) parameter) associated with various sidelink channels, an RSRP parameter (e.g., a PSSCH-RSRP parameter) associated with various sidelink channels, and/or an RSRQ parameter (e.g., a PSSCH-RSRQ parameter) associated with various sidelink channels within the measurement duration of time.

Based at least in part on the determined $R_i$, the UE 405-1 may be provided with information about channel utilization patterns (e.g., utilization of resources by one or more UEs in the past and/or expected utilization of resources by one or more UEs in the future) associated with utilization of the resources accessible in the sidelink communication network.

Additionally, or alternatively, the UE 405-1 may determine a UE density ($N_{Sta}$) that indicates a number of the plurality of UEs in the sidelink communication network. In some aspects, the UE 405-1 may determine the $N_{Sta}$ by decoding information associated with a unique TX ID and/or a unique RX ID included in SCI-2 435 (e.g., an identity of a UE indicated by a second stage of sidelink control information). Based at least in part on the information associated with the unique TX ID and/or the unique RX ID, the UE 405-1 may count a number of transmitting UEs and/or a number of receiving UEs to determine $N_{Sta}$.

Additionally, or alternatively, the UE 405-1 may determine a preferred resource utilization associated with a number of preferred resources ($R_0$) that the UE 405-1 would prefer to utilize. In some aspects, $R_0$ may be based at least in part on an amount of data to be transmitted to one or more of the plurality of UEs in the sidelink communication network. The amount of data to be transmitted may be, for example, in response to a message received by the UE 405-1 from the one or more of the plurality of the UEs. In some aspects, $R_0$ may be associated with a transmission of a communication within a preferred duration of time (e.g., 10 milliseconds, 100 milliseconds, 1000 milliseconds, and so on) and/or within a preferred number of accessible resources. In some aspects, the preferred duration of time associated with $R_0$ may be substantially equal to the measurement duration of time associated with $R_i$.

Based at least in part on the determined $R_i$ and/or $N_{Sta}$ and/or $R_0$, the UE 405-1 may determine a weighted number of UEs (WNU) in the sidelink communication network. In some aspects, the WNU may be represented by $N_{Sta}^w$. In some aspects, the UE 405-1 may determine the WNU utilizing the following relationship among the determined $R_i$, $N_{Sta}$, and $R_0$:

$$WNU = \sum_{i=1}^{N_{Sta}} \frac{R_i}{R_0}.$$

As discussed below with respect to FIG. 4, determination of the WNU enables the UE 405-1 to effectively implement the DCC and to enable fair allocation of the available resources among the plurality of UEs.

Additionally, or alternatively, the UE 405-1 may determine a CBR associated with the sidelink communication network. The CBR may indicate, for example, a relationship of the respective resource utilization ($R_i$) of the $N_{Sta}$ UEs with respect to a total number of resources accessible in the sidelink communication network. In some aspects, the UE 405-1 may determine that a resource is being utilized by one or more UEs based at least in part on determining that an S-RSSI parameter associated with the resource satisfies a threshold value (e.g., −94 dBm). In some aspects, the UE 405-1 may determine the CBR within a duration of time associated with a CBR measurement window (e.g., 100 milliseconds). In some aspects, the measurement duration of time associated with $R_i$ and/or the preferred duration of time associated with $R_0$ may be based at least in part on and/or be substantially equal to a duration of time associated with the CBR measurement window. In some aspects, the preferred duration of time associated with $R_0$ may be different (e.g., shorter, equal to, or longer) than the CBR measurement window to provide the UE 405-1 with flexibility to schedule one or more transmissions of communications. In some aspects, the measurement duration of time associated with $R_i$ and the CBR measurement window may at least partially overlap.

Additionally, or alternatively, the UE 405-1 may determine a CBR-limit that indicates, for example, a relationship of a number of resources permitted to be collectively utilized by the plurality of UEs with respect to the total number of resources accessible for sidelink communications. For instance, in a sidelink communication network having, for example, a total of 1000 resources accessible for sidelink communications and a CBR-limit of 80%, the plurality of UEs may be permitted to collectively utilize up to 800 resources.

In some aspects, the UE 405-1 may implement a DCC scheme based at least in part on the determined WNU and CBR-limit. For instance, the UE 405-1 may determine a channel occupancy ratio limit (CR-limit) utilizing the following relationship between the determined WNU and CBR-limit:

CR-limit=CBR-limit/WNU.

In some aspects, the CR-limit may indicate, for example, a number of resources permitted to be utilized by a given UE (e.g., UE 405-1) from among the total number of resources accessible in the sidelink communication network. The CR-limit may be associated with a channel occupancy ratio (CR) that may indicate, for example, a relationship of a number of resources utilized by a given UE (e.g., the UE 405-1) with respect to the total number of resources accessible for sidelink communications. In some aspects, the CR may be based at least in part on past resource utilizations of the UE 405-1 and/or expected resource utilizations of the UE 405-1 in the future.

In some aspects, the UE 405-1 may determine the CR-limit adaptively (e.g., in real time). For instance, the UE 405-1 may determine the CR-limit upon arrival of a communication for transmission by transmission circuitry of the UE 405-1 (e.g., arrival of the communication at a layer, of a protocol stack of the UE, that is responsible for sidelink communication scheduling and/or transmission). In some aspects, the UE 405-1 may determine the CR-limit periodically, for example, in anticipation of arrival of a communication for transmission.

Based at least in part on the determined CR-limit, the UE 405-1 may implement the DCC scheme. For instance, the UE 405-1 may limit the number of utilized resources to a CR-limit number of resources (e.g., the number of resources permitted to be utilized by the UE 405-1). As a result, the UE 405-1 may enable a fair allocation of the number of available resources among the plurality of UEs. In some aspects, the UE 405-1 may utilize a fewer number of resources than the CR-limit number of resources, thereby providing additional resources for utilization by another UE (e.g., UE 405-2).

Based at least in part on the determined CR-limit, the UE 405-1 may provide a sidelink reservation associated with transmission of a communication. For instance, the sidelink reservation may include information indicating that the communication may be transmitted based at least in part on the transmission satisfying the CR-limit. In some aspects, the transmission may satisfy the CR-limit based at least in part on utilizing a number of resources fewer than or equal to the CR-limit number of resources. In some aspects, the UE 405-1 may selectively transmit the communication such that the UE 405-1 may transmit the communication when the transmission satisfies the CR-limit and the UE 405-1 may refrain from transmitting the communication when the transmission fails to satisfy the CR-limit (e.g., utilizing a number of resources greater than the CR-limit number of resources).

In some aspects, the sidelink reservation may include information associated with the communication being transmitted within the preferred duration of time. Additionally, or alternatively, the sidelink reservation may include information regarding, for example, one or more subframes to be used for the transmission and/or an MCS to be used for the transmission. In some aspects, the sidelink reservation may include information regarding one or more parameters for semi-persistent scheduling (SPS), such as a periodicity of a transmission by the UE 405-1. Additionally, or alternatively, the information in the sidelink reservation may indicate event-driven scheduling, such as for an on-demand message to be transmitted by the UE 405-1. The communication transmitted by the UE 405-1 can include any form of sidelink communication, such as a data communication, a control communication, a sidelink reservation, a basic safety message, sidelink control information, radio resource control signaling, reference signaling, an on-demand message, or the like. In some aspects, the communication can include an uplink communication.

In some aspects, the UE 405-1 may determine the number of utilized resources based at least in part on a priority level associated with transmission of the communication. For instance, the UE 405-1 may utilize a first number of the available resources, fewer than or equal to the CR-limit number of resources, to transmit a communication with a first priority level, and may utilize a second number of the available resources, lower than the first number, to transmit a communication with a second priority level lower than the first priority level. As another example, the UE 405-1 may perform separate determinations of numbers of utilized resources for different priority levels of traffic.

In this way, the UE 405-1 may implement the congestion control in the sidelink network, as described herein, by limiting the number of utilized resources based at least in part on the determined CR-limit, which is based at least in part on the WNU. As a result, the UE 405-1 may avoid overloading the sidelink network by limiting transmission of a communication according to the CR-limit and be provided with a flexibility to adjust to different and/or heterogeneous resource requirements of the plurality of UEs. Application of the congestion control, as described herein, by each UE in the sidelink communication may improve utilization of the resources and an overall efficiency of the sidelink communication network.

As indicated above, FIG. 4 is provided as an example. Other examples may differ from what is described with respect to FIG. 4.

Figure 5:
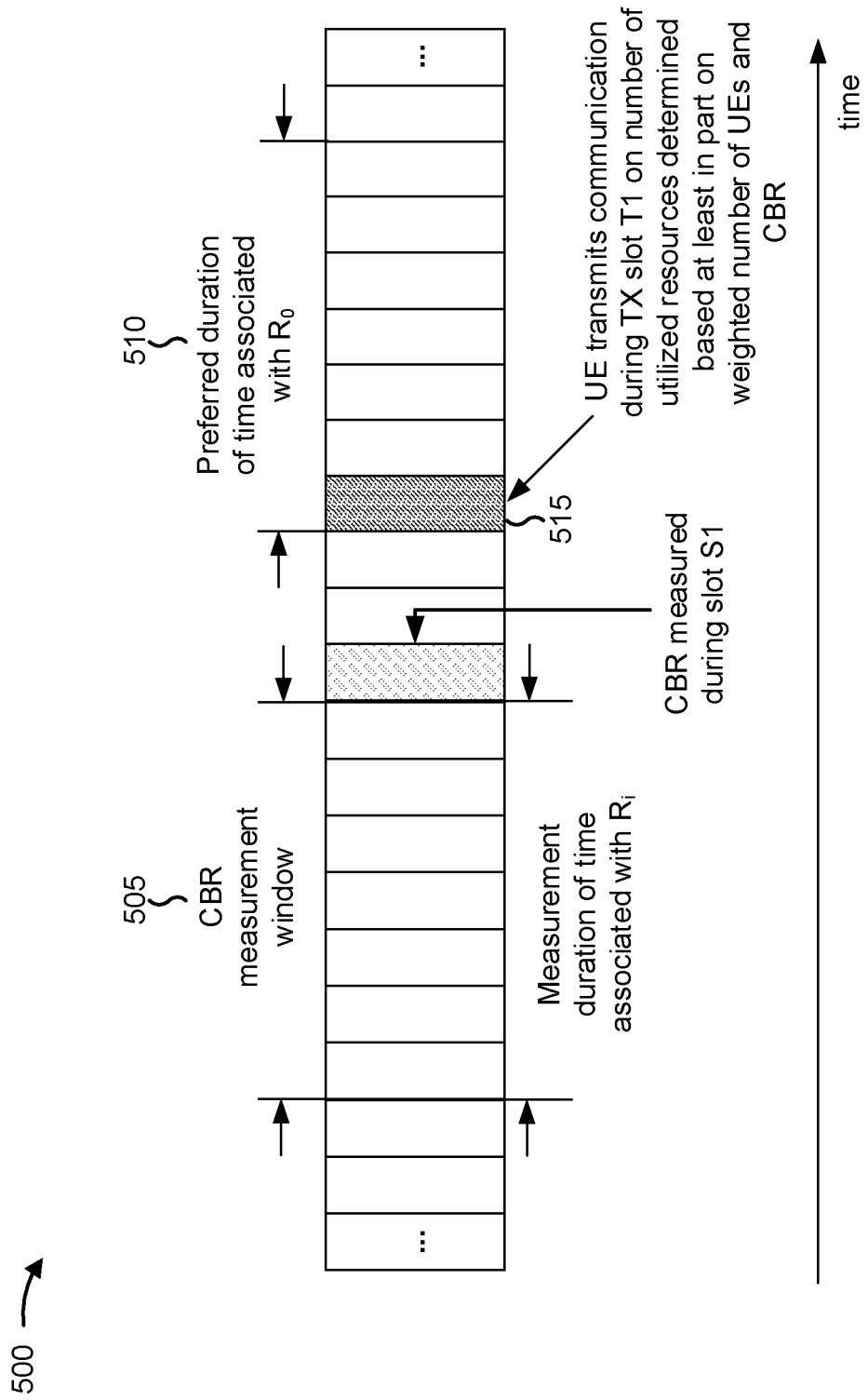
FIG. 5 is a diagram illustrating an example of congestion control in a sidelink communication network, in accordance with the present disclosure.

FIG. 5 is a diagram illustrating an example 500 of congestion control in a sidelink communication network, in accordance with the present disclosure. FIG. 5 shows an example arrangement of resources (e.g., transmission slots, transmission subframes, or the like) utilized by one or more of a plurality of UEs in the sidelink communication network. In some aspects, as shown in FIG. 5, the transmission slots may be arranged along an x-axis, which represents time. In some aspects, the transmission slots may each be of an equal duration in time. As further shown in FIG. 5, a CBR measurement window 505 may be substantially equal to a duration of time spanning, for example, seven transmission slots. The congestion control in the sidelink communication network may be performed by a UE, which may include one or more UEs discussed elsewhere herein, such as, for example, UE 120 discussed with respect to FIG. 2 and/or the UEs (e.g., UE 305-1 and/or UE 305-2) discussed with respect to FIG. 3 and/or the UEs (e.g., UE 405-1 and/or UE 405-2) discussed with respect to FIG. 4. While example 500 is described with regard to a set of time resources, the techniques described with regard to example 500 can be applied with regard to time resources, frequency resources, and/or the like.

As discussed with respect to FIG. 4, the UE may determine an $R_i$ associated with a measurement duration of time, which may be substantially equal to the CBR measurement window. In some aspects, the measurement duration of time and the CBR measurement window may at least partially overlap. For instance, as shown in FIG. 5, the measurement duration of time and the CBR measurement window overlap entirely. Additionally, or alternatively, as discussed with respect to FIG. 4, the UE may determine a UE density ($N_{Sta}$) that indicates a number of a plurality of UEs in the sidelink communication network. Additionally, or alternatively, as discussed with respect to FIG. 4, the UE may determine an $R_O$ within a preferred duration of time 510, which may be equal to the CBR measurement window.

Based at least in part on the determined $R_i$ and/or $N_{Sta}$ and/or $R_O$, the UE may determine a WNU by the plurality of UEs in the sidelink communication network. Additionally, or alternatively, as discussed with respect to FIG. 4, the UE may determine a CBR associated with the CBR measurement window. In some aspects, as shown in FIG. 5, the UE may determine the CBR during, for example, a time spanning a transmission slot (e.g., slot S1) that may immediately follow the CBR measurement window. Alternatively, the UE may determine the CBR during a time spanning another transmission slot.

As discussed with respect to FIG. 4, based at least in part on the determined WNU and CBR, the UE may determine a CR-limit, referred to herein as a resource utilization limit. Based at least in part on the determined CR-limit, the UE may determine a number of utilized resources to be utilized by the UE for transmitting a communication 515. As further discussed with respect to FIG. 4, the UE may provide a sidelink grant to effect transmission of the communication. In some aspects, the UE may transmit the communication during the preferred duration of time 510. For instance, as shown in FIG. 5, the UE may transmit the communication during a transmission slot (e.g., TX slot T1) within the preferred duration of time. In some aspects, the TX slot T1 may have a different arrangement than what is shown in FIG. 5. For example, the UE may transmit during a plurality of slots within the preferred duration of time. In other words, the shown TX slot T1 may be one of the plurality of transmission slots. In some aspects, the plurality of transmission slots may be adjacent or non-adjacent transmission slots. As another example, the TX slot T1 may be placed at any slot within the preferred duration of time (e.g., at a slot other than a first slot within the preferred duration of time).

In some aspects, as discussed with respect to FIG. 4, the UE may transmit the communication based at least in part on the transmission satisfying the CR-limit. Conversely, the UE may refrain from transmitting the communication based at least in part on the transmission failing to satisfy the CR-limit. As a result, the UE may avoid overloading the sidelink network by limiting transmission of a communication according to the CR-limit.

As indicated above, FIG. 5 is provided as an example. Other examples may differ from what is described with respect to FIG. 5.

Figure 6:
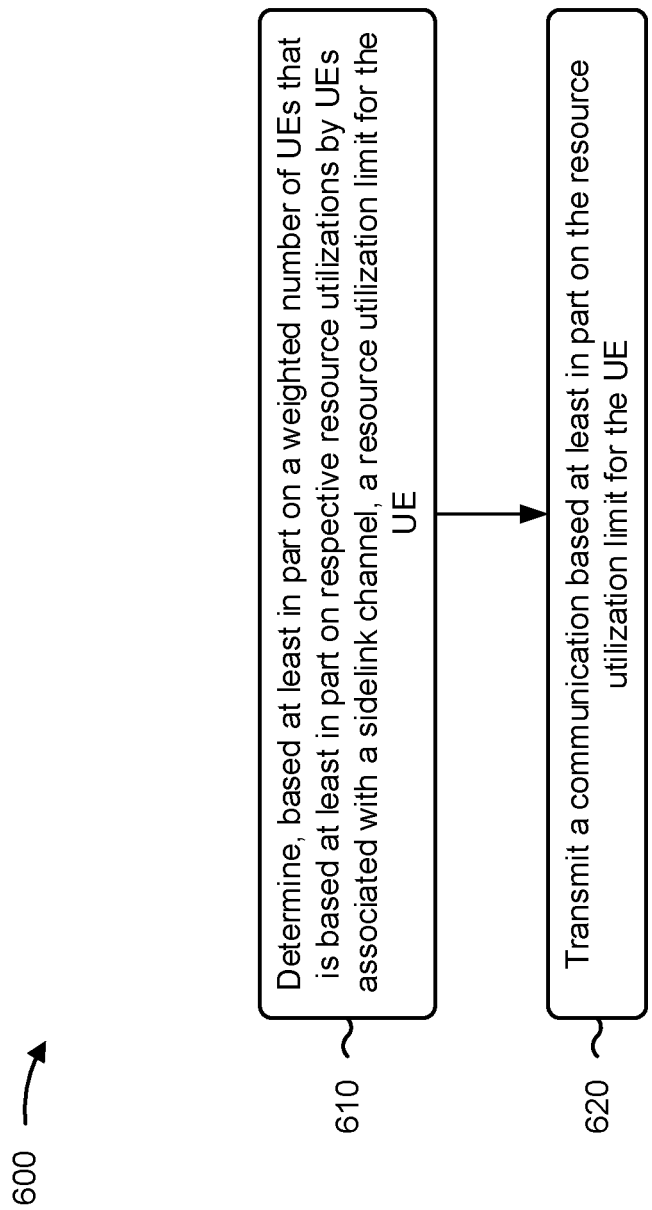
FIG. 6 is a diagram illustrating an example process associated with congestion control in a sidelink communication network, in accordance with the present disclosure.

FIG. 6 is a diagram illustrating an example process 600 associated with congestion control in a sidelink communication network, and performed by, for example, a UE, in accordance with the present disclosure. Example process 600 is an example where the UE (e.g., UE 120) performs operations associated with congestion control in a sidelink communication network.

As shown in FIG. 6, in some aspects, process 600 may include determining, based at least in part on a weighted number of UEs that is based at least in part on respective resource utilizations by UEs associated with a sidelink channel, a resource utilization limit for the UE (block 610). For example, the UE (e.g., using a determination component 708, depicted in FIG. 7) may determine, based at least in part on a weighted number of UEs that is based at least in part on respective resource utilizations by the UEs, a resource utilization limit for the UE, as described above. The weighted number of UEs may be referred to herein as "WNU." The respective resource utilizations may be referred to herein as $R_i$. The resource utilization limit may be referred to herein as a CR-limit. The UEs may be associated with a sidelink channel. For example, the UEs may be identified as part of a UE density ($N_{Sta}$) measurement. As another example, the UEs may be associated with a sidelink resource pool. For example, the weighted number of UEs or the resource utilization limit, and the selective transmission based at least in part on the resource utilization limit, may be performed per sidelink resource pool.

As further shown in FIG. 6, in some aspects, process 600 may include transmitting a communication based at least in part on the resource utilization limit for the UE (block 620). For example, the UE (e.g., using transmission component 704, depicted in FIG. 7) may transmit a communication based at least in part on the resource utilization limit for the UE, as described above. In some aspects, the UE may refrain from transmitting the communication if the resource utilization limit is not satisfied. Thus, the UE may limit transmission of communications in accordance with the resource utilization limit.

Process 600 may include additional aspects, such as any single aspect or any combination of aspects described below and/or in connection with one or more other processes described elsewhere herein.

In a first aspect, the respective resource utilizations, by the UEs, are associated with a measurement duration of time.

In a second aspect, alone or in combination with the first aspect, process 600 includes determining the weighted number of UEs based at least in part on a preferred resource utilization by the UE.

In a third aspect, alone or in combination with one or more of the first and second aspects, the preferred resource utilization by the UE is associated with a preferred duration of time.

In a fourth aspect, alone or in combination with one or more of the first through third aspects, the preferred duration of time is equal to a measurement duration of time associated with the respective resource utilizations by the UEs.

In a fifth aspect, alone or in combination with one or more of the first through fourth aspects, process 600 includes determining the resource utilization limit for the UE based at least in part on a ratio of an overall utilization limit (e.g., a CBR limit) and the weighted number of UEs.

In a sixth aspect, alone or in combination with one or more of the first through fifth aspects, process 600 includes determining the weighted number of UEs based at least in part on sidelink control information.

In a seventh aspect, alone or in combination with one or more of the first through sixth aspects, process 600 includes determining the respective resource utilizations based at least in part on identities of the UEs (e.g., unique TX IDs or unique RX IDs) indicated by a second stage of the sidelink control information (e.g., SCI-2), and based at least in part on resources indicated by a first stage of the sidelink control information (e.g., SCI-1). For example, the resources may be indicated for communications scheduled by the SCI-1 or may be for the SCI-2.

In an eighth aspect, alone or in combination with one or more of the first through seventh aspects, the resource utilization limit is determined in real time.

In a ninth aspect, alone or in combination with one or more of the first through eighth aspects, the resource utilization limit is associated with a channel occupancy ratio, which is based at least in part on at least one of a past resource utilization of the UE or a future resource utilization of the UE.

In a tenth aspect, alone or in combination with one or more of the first through ninth aspects, process 600 includes estimating the weighted number of UEs.

In an eleventh aspect, alone or in combination with one or more of the first through tenth aspects, the resource utilization limit is determined based at least in part on a packet of the communication arriving for transmission.

In a twelfth aspect, alone or in combination with one or more of the first through eleventh aspects, transmitting the communication includes transmitting the communication when a resource utilization of the UE satisfies the resource utilization limit for the UE.

In a thirteenth aspect, alone or in combination with one or more of the first through twelfth aspects, if a resource utilization of the UE, associated with another communication, fails to satisfy the resource utilization limit, the method comprises refraining from transmitting the other communication.

In a fourteenth aspect, alone or in combination with one or more of the first through thirteenth aspects, the preferred duration of time is longer than a measurement duration of time associated with the respective resource utilizations by the UEs.

In a fifteenth aspect, alone or in combination with one or more of the first through fourteenth aspects, the resource utilization limit is a channel occupancy ratio limit.

In a sixteenth aspect, alone or in combination with one or more of the first through fifteenth aspects, the weighted number of UEs is determined for a sidelink resource pool.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
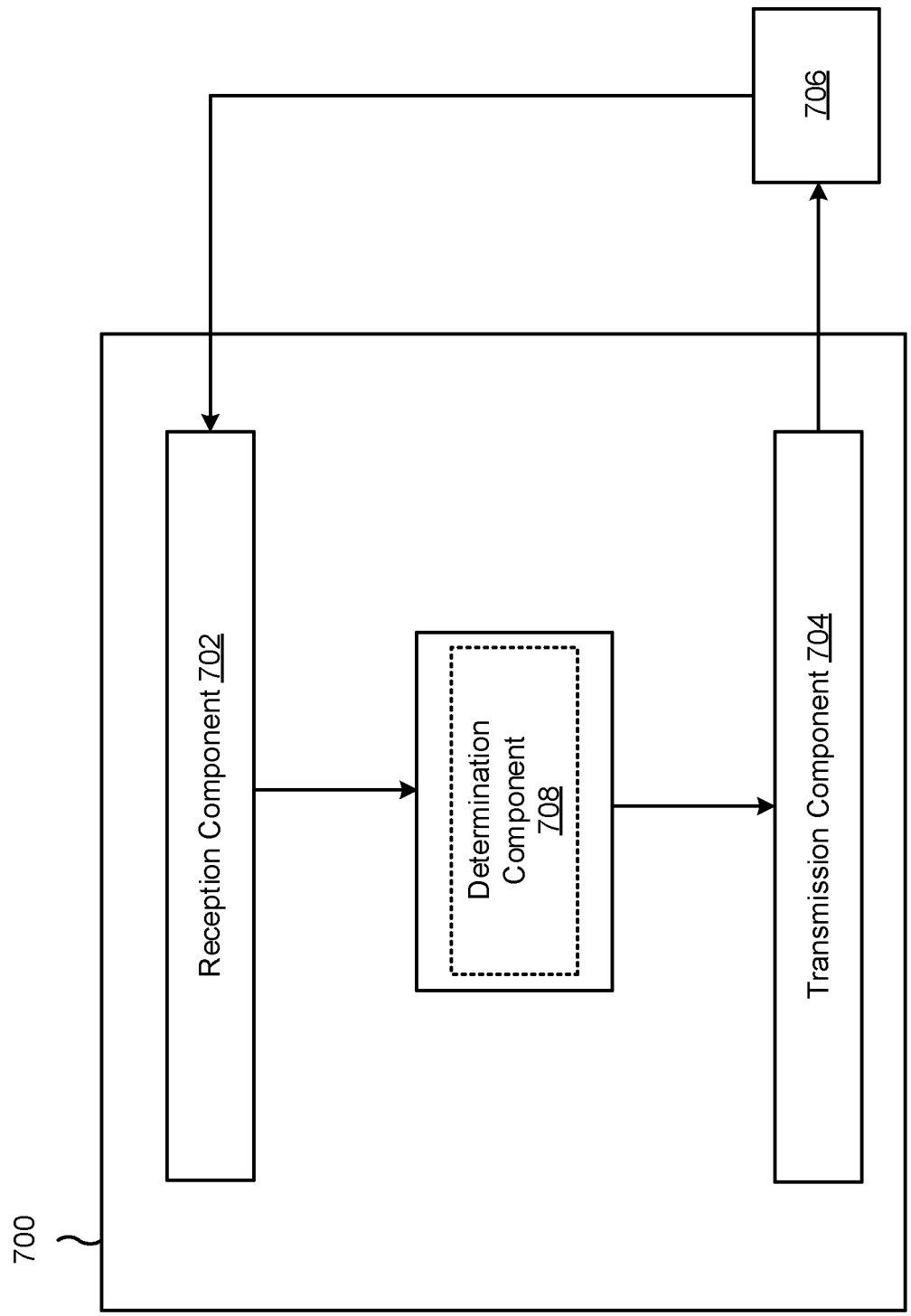
FIG. 7 is a diagram illustrating an example apparatus associated with congestion control in a sidelink communication network, in accordance with the present disclosure.

FIG. 7 is a diagram illustrating an example apparatus 700 associated with congestion control in a sidelink communication network, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The determination component 708 may determine, based at least in part on a weighted number of UEs that is based at least in part on respective resource utilizations by the UEs, a resource utilization limit for the UE. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 704 may selectively transmit a communication based at least in part on the resource utilization limit for the UE.

The determination component 708 may determine the weighted number of UEs based at least in part on a preferred resource utilization by the UE. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 708 may determine the resource utilization limit for the UE based at least in part on a ratio of an overall utilization limit on utilization and the weighted number of UEs. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 708 may determine the weighted number of UEs based at least in part on sidelink control information. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 708 may determine the respective resource utilizations based at least in part on identities of the UEs indicated by a second stage of the sidelink control information. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 708 may determine the respective resource utilizations based at least in part on a first stage of the sidelink control information. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 708 may estimate the weighted number of UEs. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: determining, based at least in part on a weighted number of UEs in a sidelink communication network that is based at least in part on respective resource utilizations of a channel of the sidelink communication network by the UEs, a resource utilization limit for the UE to utilize the channel; and selectively transmitting a communication on the channel of the sidelink communication network based at least in part on the resource utilization limit for the UE.

Aspect 2: The method of Aspect 1, wherein the respective resource utilizations of the channel, by the UEs, are associated with a measurement duration of time.

Aspect 3: The method of any of Aspects 1-2, further comprising: determining the weighted number of UEs based at least in part on a preferred resource utilization of the channel by the UE.

Aspect 4: The method of Aspect 3, wherein the preferred resource utilization of the channel by the UE is associated with a preferred duration of time.

Aspect 5: The method of Aspect 4, wherein the preferred duration of time is equal to a measurement duration of time associated with the respective resource utilizations of the channel by the UEs.

Aspect 6: The method of Aspect 4, wherein the preferred duration of time is different than a measurement duration of time associated with the respective resource utilizations of the channel by the UEs.

Aspect 7: The method of any of Aspects 1-6, wherein determining the resource utilization limit further comprises: determining the resource utilization limit for the UE based at least in part on a ratio of an overall utilization limit on utilization of the channel and the weighted number of UEs.

Aspect 8: The method of any of Aspects 1-7, further comprising: determining the weighted number of UEs based at least in part on sidelink control information.

Aspect 9: The method of Aspect 8, further comprising: determining the respective resource utilizations based at least in part on identities of the UEs indicated by a second stage of the sidelink control information, and determining the respective resource utilizations based at least in part on a first stage of the sidelink control information.

Aspect 10: The method of any of Aspects 1-9, wherein the resource utilization limit is determined in real time.

Aspect 11: The method of any of Aspects 1-10, wherein the resource utilization limit is associated with a channel occupancy ratio, which is based at least in part on at least one of a past resource utilization of the UE or a future resource utilization of the UE.

Aspect 12: The method of any of Aspects 1-11, further comprising: estimating the weighted number of UEs.

Aspect 13: The method of any of Aspects 1-12, wherein the resource utilization limit is determined based at least in part on the communication arriving for transmission.

Aspect 14: The method of any of Aspects 1-13, wherein selectively transmitting the communication on the channel of the sidelink communication network includes transmitting the communication on the channel of the sidelink communication network when a resource utilization of the UE satisfies the resource utilization limit for the UE.

Aspect 15: The method of any of Aspects 1-14, wherein selectively transmitting the communication on the channel of the sidelink communication network includes refraining from transmitting the communication on the channel of the sidelink communication network when a resource utilization of the UE fails to satisfy the resource utilization limit for the UE.

Aspect 16: A method of wireless communication performed by a user equipment (UE), comprising: determining, based at least in part on a weighted number of UEs that is based at least in part on respective resource utilizations by UEs associated with a sidelink channel, a resource utilization limit for the UE; and transmitting a communication based at least in part on the resource utilization limit for the UE.

Aspect 17: The method of Aspect 16, wherein the respective resource utilizations by the UEs, are associated with a measurement duration of time.

Aspect 18: The method of any of Aspects 16-17, further comprising: determining the weighted number of UEs based at least in part on a preferred resource utilization by the UE.

Aspect 19: The method of Aspect 18, wherein the preferred resource utilization by the UE is associated with a preferred duration of time.

Aspect 20: The method of Aspect 19, wherein the preferred duration of time is equal to a measurement duration of time associated with the respective resource utilizations by the UEs.

Aspect 21: The method of Aspect 19, wherein the preferred duration of time is different than a measurement duration of time associated with the respective resource utilizations by the UEs.

Aspect 22: The method of any of Aspects 16-21, wherein determining the resource utilization limit further comprises: determining the resource utilization limit for the UE based at least in part on a ratio of an overall utilization limit and the weighted number of UEs.

Aspect 23: The method of any of Aspects 16-22, further comprising: determining the weighted number of UEs based at least in part on sidelink control information.

Aspect 24: The method of Aspect 23, further comprising: determining the respective resource utilizations based at least in part on identities of the UEs indicated by a second stage of the sidelink control information, and based at least in part on resources indicated by a first stage of the sidelink control information.

Aspect 25: The method of any of Aspects 16-24, wherein the resource utilization limit is determined in real time.

Aspect 26: The method of any of Aspects 16-25, wherein the resource utilization limit is associated with a channel occupancy ratio, which is based at least in part on at least one of a past resource utilization of the UE or a future resource utilization of the UE.

Aspect 27: The method of any of Aspects 16-26, further comprising: estimating the weighted number of UEs.

Aspect 28: The method of any of Aspects 16-27, wherein the resource utilization limit is determined based at least in part on a packet of the communication arriving for transmission.

Aspect 29: The method of any of Aspects 16-28, wherein transmitting the communication includes transmitting the communication when a resource utilization of the UE satisfies the resource utilization limit for the UE.

Aspect 30: The method of any of Aspects 16-29, wherein, if a resource utilization of the UE, associated with another communication, fails to satisfy the resource utilization limit, the method further comprises refraining from transmitting the other communication.

Aspect 31: The method of any of Aspects 16-30, wherein the resource utilization limit is a channel occupancy ratio limit.

Aspect 32: The method of any of Aspects 16-31, wherein the weighted number of UEs is determined for a sidelink resource pool.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      determine, based at least in part on a weighted number of UEs that is based at least in part on respective resource utilizations by UEs associated with a sidelink channel, a resource utilization limit for the UE; and
      transmit a communication based at least in part on the resource utilization limit for the UE.

2. The UE of claim 1, wherein the respective resource utilizations by the UEs, are associated with a measurement duration of time.

3. The UE of claim 1, wherein the one or more processors, to determine the resource utilization limit, are configured to:
   determine the resource utilization limit for the UE based at least in part on a ratio of an overall utilization limit and the weighted number of UEs.

4. The UE of claim 1, wherein the one or more processors are further configured to:
   determine the weighted number of UEs based at least in part on sidelink control information.

5. The UE of claim 4, wherein the one or more processors are further configured to:
   determine the respective resource utilizations based at least in part on identities of the UEs indicated by a second stage of the sidelink control information, and based at least in part on resources indicated by a first stage of the sidelink control information.

6. The UE of claim 1, wherein the one or more processors are configured to:
   determine the weighted number of UEs based at least in part on a preferred resource utilization by the UE.

7. The UE of claim 6, wherein the preferred resource utilization by the UE is associated with a preferred duration of time.

8. The UE of claim 7, wherein the preferred duration of time is equal to a measurement duration of time associated with the preferred resource utilizations by the UEs.

9. The UE of claim 7, wherein the preferred duration of time is different than a measurement duration of time associated with the preferred resource utilizations by the UEs.

10. The UE of claim 1, wherein the resource utilization limit is determined in real time.

11. The UE of claim 1, wherein the resource utilization limit is associated with a channel occupancy ratio, which is based at least in part on at least one of a past resource utilization of the UE or an expected resource utilization of the UE.

12. The UE of claim 1, wherein the resource utilization limit is determined based at least in part on a packet of the communication arriving for transmission.

13. The UE of claim 1, wherein the one or more processors, to transmit the communication, are configured to transmit the communication when a resource utilization of the UE satisfies the resource utilization limit for the UE.

14. The UE of claim 1, wherein, if a resource utilization of the UE, associated with another communication, fails to satisfy the resource utilization limit, the one or more processors are configured to refrain from transmitting the other communication.

15. The UE of claim 1, wherein the resource utilization limit is a channel occupancy ratio limit.

16. The UE of claim 1, wherein the weighted number of UEs is determined for a sidelink resource pool.

17. A method of wireless communication performed by a user equipment (UE), comprising:
- determining, based at least in part on a weighted number of UEs that is based at least in part on respective resource utilizations by UEs associated with a sidelink channel, a resource utilization limit for the UE; and
- transmitting a communication based at least in part on the resource utilization limit for the UE.

18. The method of claim 17, wherein the weighted number of UEs is determined for a sidelink resource pool.

19. The method of claim 17, wherein the respective resource utilizations by the UEs, are associated with a measurement duration of time.

20. The method of claim 17, further comprising:
- determining the weighted number of UEs based at least in part on a preferred resource utilization by the UE.

21. The method of claim 17, wherein determining the resource utilization limit further comprises:
- determining the resource utilization limit for the UE based at least in part on a ratio of an overall utilization limit and the weighted number of UEs.

22. The method of claim 17, further comprising:
- determining the weighted number of UEs based at least in part on sidelink control information.

23. The method of claim 17, wherein the resource utilization limit is determined in real time.

24. The method of claim 17, wherein the resource utilization limit is associated with a channel occupancy ratio, which is based at least in part on at least one of a past resource utilization of the UE or an expected resource utilization of the UE.

25. The method of claim 17, wherein the resource utilization limit is determined based at least in part on a packet of the communication arriving for transmission.

26. The method of claim 17, wherein transmitting the communication comprises transmitting the communication when a resource utilization of the UE satisfies the resource utilization limit for the UE.

27. A non-transitory computer-readable medium storing a set of instructions for wireless communication, the set of instructions comprising:
- one or more instructions that, when executed by one or more processors of a user equipment (UE), cause the UE to:
  - determine, based at least in part on a weighted number of UEs that is based at least in part on respective resource utilizations by UEs associated with a sidelink channel, a resource utilization limit for the UE; and
  - transmit a communication based at least in part on the resource utilization limit for the UE.

28. The non-transitory computer-readable medium of claim 27, wherein the respective resource utilizations by the UEs, are associated with a measurement duration of time.

29. An apparatus for wireless communication, comprising:
- means for determining, based at least in part on a weighted number of user equipment (UEs) that is based at least in part on respective resource utilizations by UEs associated with a sidelink channel, a resource utilization limit for the apparatus; and
- means for transmitting a communication based at least in part on the resource utilization limit for the apparatus.

30. The apparatus of claim 29, wherein the respective resource utilizations by the UEs, are associated with a measurement duration of time.

* * * * *